United States Patent [19]

Devine

[11] Patent Number: 5,709,550
[45] Date of Patent: Jan. 20, 1998

[54] KEYBOARD TRAINING APPARATUS

[75] Inventor: Debra E. Devine, 9485 Bay Vista West Dr., Indianapolis, Ind. 46250

[73] Assignee: Debra E. Devine, Indianapolis, Ind.

[21] Appl. No.: 704,023

[22] Filed: Aug. 28, 1996

Related U.S. Application Data

[60] Provisional application No. 60/003,131, Sep. 1, 1995.
[51] Int. Cl.⁶ ............................................... G09B 13/04
[52] U.S. Cl. ................................... 434/227; 400/715
[58] Field of Search ................................ 434/227, 231; 400/714, 715

[56] References Cited

U.S. PATENT DOCUMENTS

| | | | |
|---|---|---|---|
| 1,277,169 | 8/1918 | Anderson | 434/227 |
| 1,801,669 | 4/1931 | Hintz et al. | 400/715 |
| 2,427,694 | 9/1947 | Sieurin | 434/227 |
| 3,229,800 | 1/1966 | Krag | 434/227 |
| 3,559,302 | 2/1971 | Little | 434/227 |
| 3,971,140 | 7/1976 | Martinez | 434/227 |
| 4,294,557 | 10/1981 | Blanchard et al. | 434/227 |
| 5,050,826 | 9/1991 | Johnston | 400/715 |
| 5,242,139 | 9/1993 | Aldrich | 400/715 |
| 5,375,800 | 12/1994 | Wilcox et al. | 400/715 |

*Primary Examiner*—Paul J. Hirsch
*Attorney, Agent, or Firm*—Marilyn L. Amick

[57] ABSTRACT

Training apparatus for use with a keyboard comprises a rigid support and a stabilizing bar having optional hand guides. The stabilizing bar is attached to the support, preferably pivotably, such that, when said training apparatus is positioned in front of a keyboard, an operator's hands are positioned between but not touching the support and the stabilizing bar when the operator's fingers are positioned over their home keys on the keyboard. In an alternate embodiment, the support for the stabilizing bar is formed integrally with the keyboard support.

20 Claims, 3 Drawing Sheets

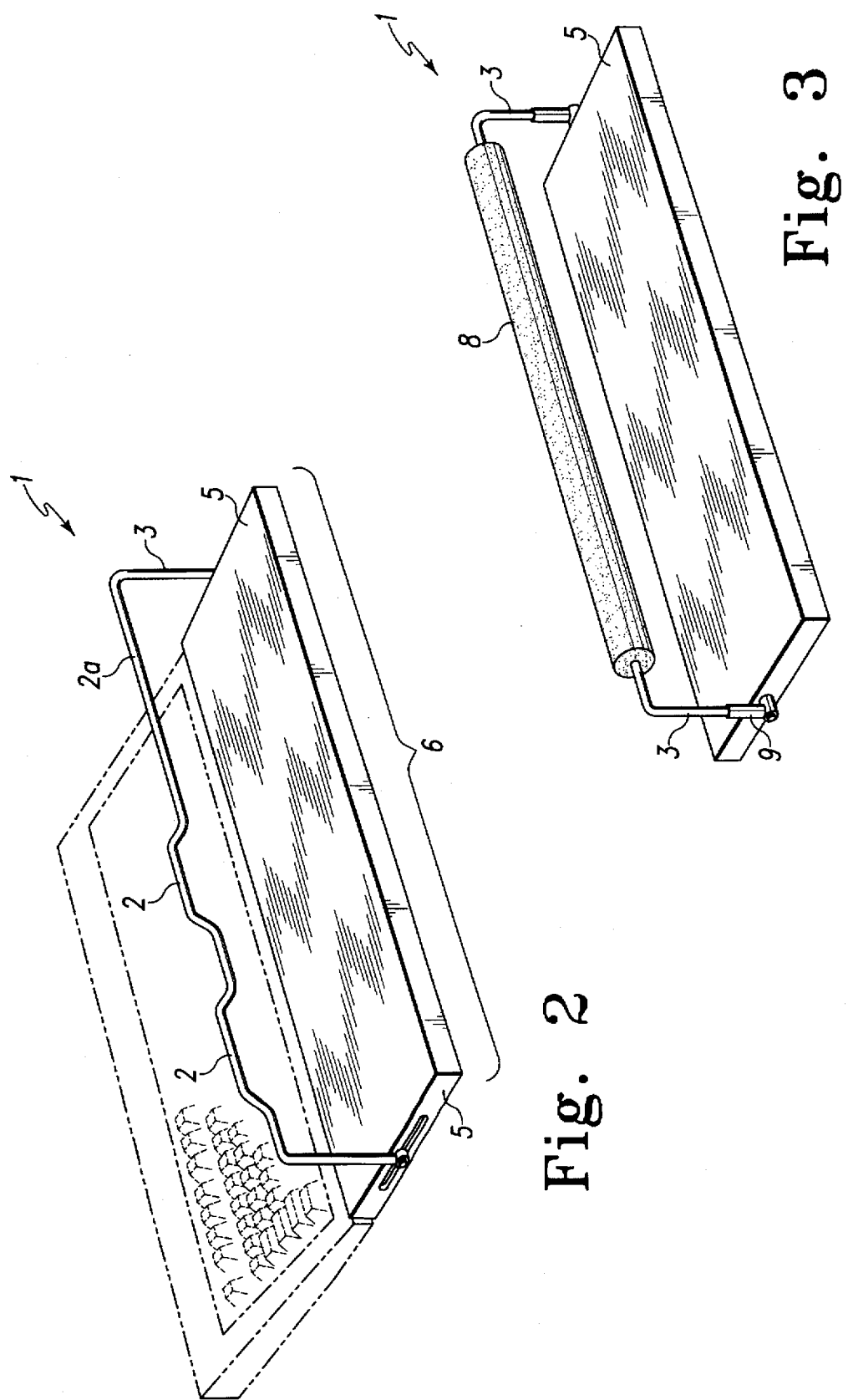

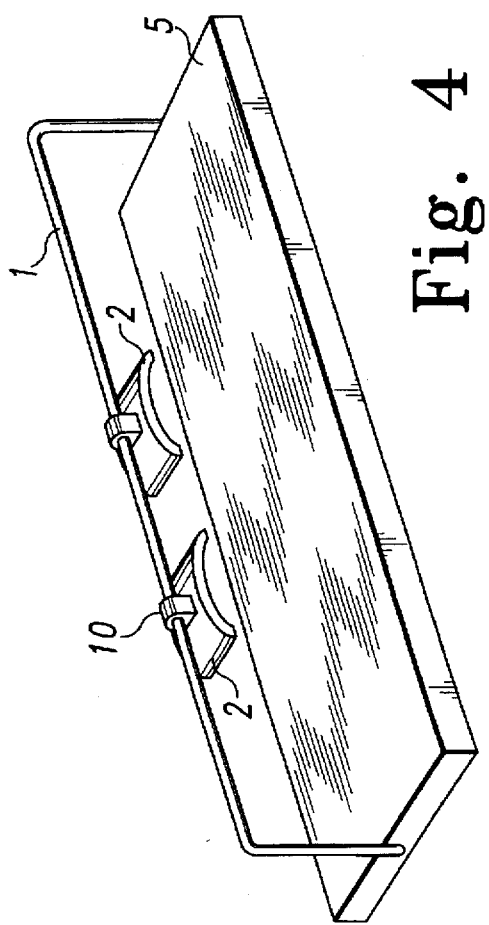
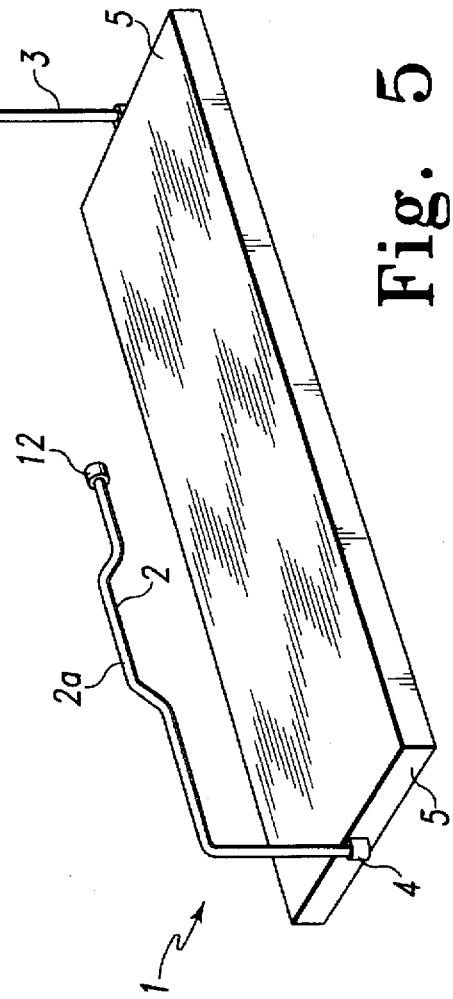
Fig. 4
Fig. 5

KEYBOARD TRAINING APPARATUS

This application claims the benefit of U.S. Provisional Application Ser. No. 60/003,131 filed Sep. 1, 1995.

BACKGROUND OF THE INVENTION

The present invention relates to a keyboard training apparatus. More specifically, the invention relates to a home key reminder and hand positioning apparatus adjustable to the special physical characteristics of a young or small keyboard operator in a way that assists the operator in learning keyboarding and in keeping the hands positioned over the home keys.

Word processors and computers primarily rely upon data entry keyboards for inputting information into the computer, electronic typewriter or word processor for subsequent display and/or printing.

For many years, the position of keys on typewriter and other data entry keyboards has been standardized. The standard universal keyboard that is in use today is known as the QWERTY. The name is derived from the first six keys on the top row of letters on a four row keyboard. The QWERTY arrangement was invented and patented over 100 years ago to solve mechanical problems and to keep keys from jamming as a result of some unique characteristics of the all-mechanical typewriters which existed at the time of the invention. The QWERTY keyboard continued to be used because of widespread mastery by secretaries and data input operators, even long after the reasons for its original development no longer were applicable. Today's electronic typewriters, word processors and computers completely eliminate the necessity for the inefficient QWERTY keyboard layout. This layout, however, has continued to dominate the market today, long after its need has disappeared. Computer keyboard buffers, which separate keys that are too quickly struck, eliminate all of the problems which the QWERTY keyboard originally was designed to overcome.

The most widely accepted method for efficient keyboard input is the touch typing method. In this method, the typist or keyboard operator places the fingers on the correct home keys across the width of the keyboard, which read "ASDFJKL;" from left to right. The thumbs are placed over the space bar. Each finger rests lightly on its home key and does not move unless it reaches to strike keys immediately above or below the home key or, in the case of each of the index fingers, the additional four keys immediately to the side of the home key, then the finger quickly returns to its home key. Thus, each finger has only certain keys that it should strike.

To keyboard correctly, the typist must use the touch typing method described above. There is no middle ground in proper typing; if the typist is not typing correctly, he is typing incorrectly.

Until recently, keyboarding has been a skill commonly taught at the high school level. Many suitable teaching systems exist for students at that level. However, the explosive growth in the use of computers has reached as far down as elementary school, and students as young as kindergartners and even younger are now using a computer keyboard to work various computer programs. The keys on the keyboard are not in alphabetical order, and even locating a key many times is difficult, to say nothing of attempting to strike keys with the correct finger. The keyboard is an overwhelming mystery to these students. Moreover, the poor habits that they learn at this age will significantly hamper their ability to learn correct typing procedure. Typing teachers agree that students who form incorrect keyboarding techniques are extremely difficult to retrain. It is much more difficult to teach a student who has ingrained, incorrect habits of keyboarding than to teach a student who has never used the keyboard. Breaking incorrect habits is frustrating and next to impossible in many cases.

The prior art has focused much attention on modifications to keyboards to make them more efficient and functional for adult users. However, little attention has been given to the special physical needs and biomechanical requirements of children and young keyboard users. Keyboarding is a valuable skill for young children to develop as they learn to read and use written expression. However, traditional keyboards do not allow children to develop true keyboarding skills until their hands have an appropriate reach. There is a need for the keyboard technology currently available to be more readily accessible to young children as they develop their learning skills.

SUMMARY OF THE INVENTION

The keyboard training apparatus of the present invention provides an enhancement in the form of an addition or an extension to keyboards used with computers and word processors. In a preferred embodiment, the present invention provides an apparatus for use with a standard keyboard comprising a support or base to which has been attached a stabilizing bar having a body with an axis that extends horizontally between points of attachment to the support, which is positioned in front of and parallel to the keyboard and rows of keys. In a preferred embodiment, the stabilizing bar also comprises contoured hand guides.

In another embodiment of the invention, the support to which the stabilizing bar is attached can be formed integral with the keyboard itself. In this example, the body of the keyboard to which the keys are attached has been adapted by means of laterally extending the keyboard body in front of and parallel to the rows of keys so as to form a support for receiving the attachment means for attaching the stabilizing bar.

BRIEF DESCRIPTION OF THE DRAWINGS

FIG. 2 is a front view of the embodiment shown in FIG. 1 wherein the stabilizing bar and support of the training apparatus are positioned for use in front of a keyboard.

FIG. 3 illustrates an embodiment of the invention in which the stabilizing bar is covered by a padded or cushioned layer.

FIG. 4 illustrates an embodiment in which contoured hand guides are slidably mounted on the stabilizing bar.

FIG. 5 illustrates an embodiment in which the stabilizing bar has been divided into two hinged sections which are fastened together when the training apparatus is in use and swung to the side when not in use.

DESCRIPTION OF THE PREFERRED EMBODIMENTS

Figure 1:
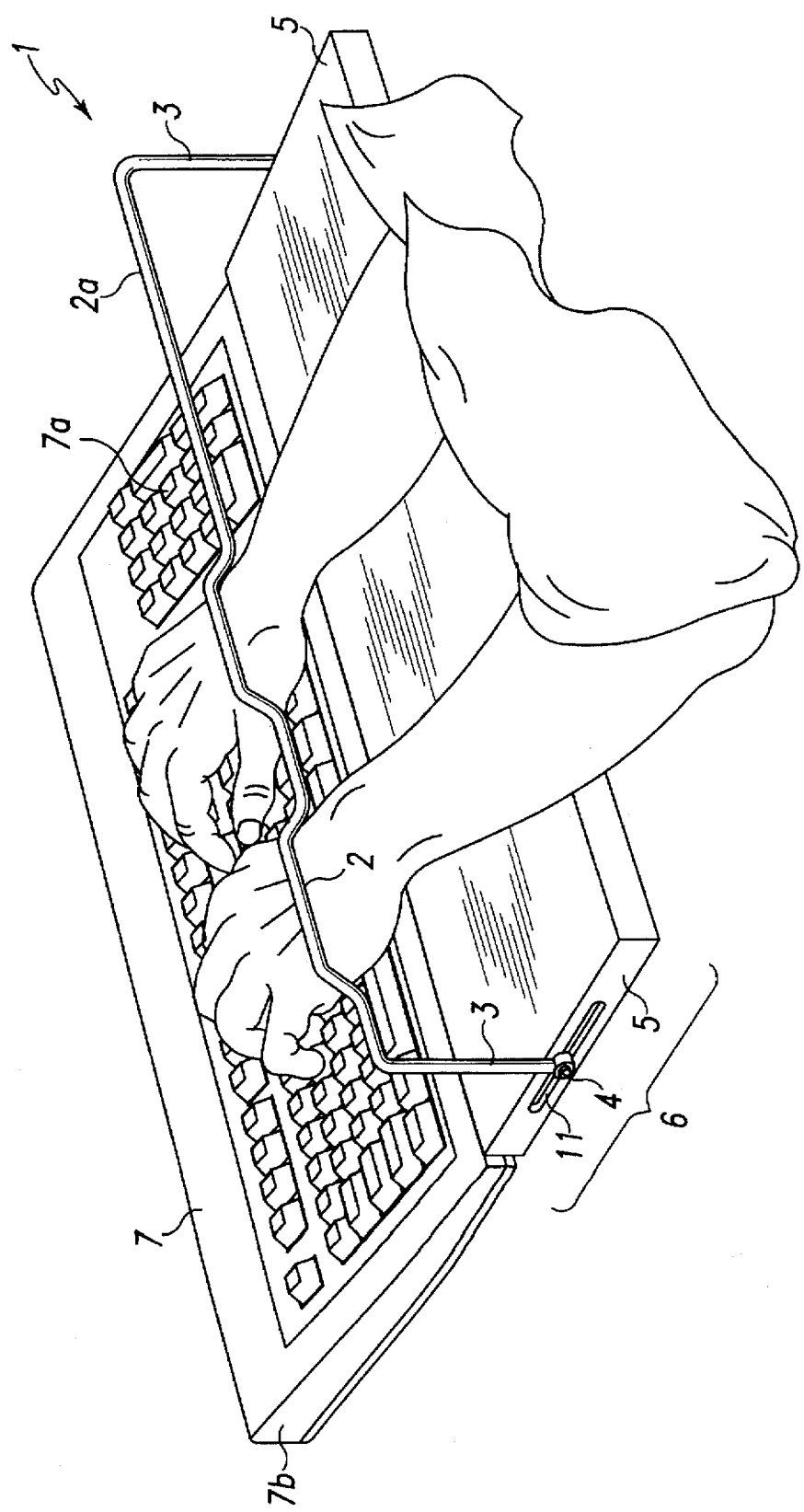
FIG. 1 is a side view illustrating the hands of a keyboard operator positioned at a keyboard with the training apparatus in accordance with the present invention.

Referring to FIG. 1, the operator's hands and wrists are shown in home position over keyboard 7 with training apparatus 6 positioned in front of and parallel to the keyboard. The keyboard is comprised of keys 7a attached to body 7b. The training apparatus is comprised of stabilizing bar 1, which is comprised of horizontally positioned body 2a having an axis and extending longitudinally and ending in left and right arms 3. The arms are pivotably attached to support 5 by attachment means 4. In this embodiment, the body is contoured to form guides 2, and the support is adapted with grooves 11 for receiving the attachment means.

Referring to FIG. 2, training apparatus 6 of the present invention comprises stabilizing bar 1, which is pivotably attached to support 5 by left and right attachment means 4. In this embodiment, horizontal body 2a of the stabilizing bar is contoured to form left and right hand guides 2. The guides comprise that portion of the body of the stabilizing bar that is positioned just over the wrists and backs of the hands when the hands of an operator are in proper typing position over the home keys of the keyboard. The guides may be formed as a part of the body of the stabilizing bar itself, contoured to the shape of an operator's hands, or the guides may be formed separately and attached to the body of the stabilizing bar by mounting means as illustrated in FIG. 4. When the training apparatus of the present invention is in position for use, the stabilizing bar and guides are over, but not touching, the operator's left and right hands as the operator strikes the keys on the keyboard. If the operator's attention is diverted and the hand and wrist are allowed to stray from home position, the hand or wrist will come into contact with the guide, and this physical contact will alert and remind the operator that his hand is about to stray or drift from proper typing position.

The stabilizing bar may be made of any rigid material that holds a shape such as plastic, metal or wood. Cost, aesthetics and means used for attachment of the bar to the support will be considerations when selecting a material for the stabilizing bar. The attachment means may be any means which serve to fasten the arms of the stabilizer bar, preferably pivotably, to the support so that the bar is retained in position just over the operator's hands when in use, and can be folded out of the way or removed when not in use. Several adjustable positions for the bar may be provided for by providing the attachment means with intermediate stops for the arms of the bar. Various materials and attachment means for use in constructing the apparatus of the invention will be well known to those skilled in the art of designing and manufacturing keyboards.

Optionally, the support or base to which the stabilizing bar is attached can also be covered by a padded or cushioned material so that it also functions as a wrist support. The sides of the support are adapted to receive the attachment means of left and right arms, such as with groove or track 11, which also permits adjustment of the stabilizing bar so that the arms and body of the stabilizing bar may be moved closer to or farther from the keyboard to accommodate the biomechanical requirements of the operator.

Referring to FIG. 3, an embodiment is illustrated in which left and right stabilizing bar arms 3 are provided with telescopic adjustment means 9 such that the arms may be lengthened or shortened to adjust to the size of the individual operator. Optionally, the stabilizing bar and guides can be padded or covered with a soft, compressible material 8 such as polyurethane foam, felt or other cushioning material for comfort and aesthetics. Support 5 may be made of any material which holds a shape, such as plastic, wood or metal, that is firm enough to support the arms of the stabilizing bar and to securely receive attachment means for the arms.

Referring to the embodiment shown in FIG. 4, left and right guides 2 are separate structures from stabilizing bar 1 and are attached thereto by mounting means 10, which are preferably chosen such that the guides are mounted displaceably in a plane along the axis and slidably adjustable along the length of the body of the stabilizing bar. The guides may also be attached so that they are pivotably adjustable around the circumference of the bar.

Referring to FIG. 5, body 2a of stabilizing bar 1 is divided into left and right sections and provided with fastening means 12 between left and right guides 2 and attachment means 4 comprises a hinged means such that the guides may be swung out of position and/or removed from the support.

In all embodiments of the present invention, it is preferred that the keyboard itself be reduced from the standard adult size to a size more suitable physically to younger or smaller hands.

In all embodiments described, the keyboard body and the stabilizing bar support may also be formed together as an integral unit, thereby rendering the training apparatus permanently affixed to the keyboard. In this example, the stabilizing bar is preferably attached pivotably to the keyboard body/support so that is can be conveniently folded out of the way when not in use.

Other modifications and perturbations of the present invention will suggest themselves to those skilled in the art. For example, the stabilizing bar or guides may comprise a vibrating means or a sound device which can alert the operator when the hands or wrists come into contact with the bar or guides. In another embodiment of the training apparatus, the stabilizing bar is replaced by a beam of light from a sensor, and the arms of the bar and the support are adapted to house a sensor, detector and signal means. The support for the stabilizing bar may also be designed to comprise or accommodate a track ball. Such modifications and perturbations are all considered to be within the spirit and scope of the invention described and claimed herein.

What is claimed is:

1. An apparatus for use with a keyboard comprising
   (a) a support and
   (b) a stabilizing bar comprising a body having an axis extending longitudinally and ending in left and right arms, said arms comprising attachment means for attaching said bar to said support, said support being adapted to receive said attachment means such that, when said apparatus is positioned in front of and parallel to said keyboard, an operator's hands will be positioned between said support and said stabilizing bar when the fingers of said operator are positioned over said keyboard.

2. The apparatus of claim 1, wherein said bar is pivotably attached to said support.

3. The apparatus of claim 2, wherein said bar is covered by a padded layer.

4. The apparatus of claim 2, wherein said body comprises guides for said hands.

5. The apparatus of claim 2, wherein said support comprises grooves for receiving said attachment means.

6. The apparatus of claim 2, wherein said attachment means comprises intermediate stops for said left and right arms.

7. The apparatus of claim 2, wherein said left and right arms comprise telescopic adjustment means.

8. The apparatus of claim 2, wherein said body comprises two hinged sections.

9. The apparatus of claim 4, wherein said guides are integral with said stabilizing bar and aligned along said axis thereof.

10. The apparatus of claim 4, wherein said guides are mounted displaceably in a plane along said axis.

11. The apparatus of claim 4, wherein said guides are covered by a padded layer.

12. An apparatus comprising
(a) a keyboard comprising a body and keys attached to said body and operable while fingers of an operator remain positioned on said keys; and
(b) a stabilizing bar comprising a body extending longitudinally and ending in left and right arms, said arms comprising attachment means for attaching said bar to said keyboard, said keyboard body being adapted for receiving said attachment means.

13. The apparatus of claim 12, whereto said bar is pivotably attached to said keyboard body.

14. The apparatus of claim 13, wherein said stabilizing bar body comprises guides for said hands.

15. The apparatus of claim 13, wherein said attachment means comprises intermediate stops for said left and right arms.

16. The apparatus of claim 13, wherein said left and right arms comprise telescopic adjustment means.

17. The apparatus of claim 13, wherein said stabilizing bar body comprises two hinged sections.

18. The apparatus of claim 14, wherein said guides are integral with said stabilizing bar and aligned along said axis thereof.

19. The apparatus of claim 14, wherein said guides are mounted displaceably in a plane along said axis.

20. The apparatus of claim 14, whereto said guides are covered by a padded layer.

* * * * *